United States Patent [19]
Lemercier

[11] 3,945,165
[45] Mar. 23, 1976

[54] HEAT-INSULATING SYSTEM FOR A FAST REACTOR SHIELD SLAB

[75] Inventor: Guy Lemercier, Le-puy-Sainte-Reparade, France

[73] Assignee: Commissariat a l'Energie Atomique, Paris, France

[22] Filed: June 17, 1974

[21] Appl. No.: 480,269

[30] Foreign Application Priority Data
June 26, 1973 France .................. 73.23339

[52] U.S. Cl. .............. 52/406; 52/619; 52/410
[51] Int. Cl.² ........................................ E04B 2/00
[58] Field of Search ........... 52/378, 379, 508, 404,
52/406, 408, 410, 510, 617, 619, 461, 463,
469, 267, 249; 432/249, 250; 110/99 R; 85/9 R, 9 W

[56] References Cited
UNITED STATES PATENTS

| | | |
|---|---|---|
| 1,677,887 | 7/1928 | Bradford ............... 52/459 |
| 1,910,160 | 5/1933 | Gorman ................ 52/466 |
| 2,134,705 | 11/1938 | Crecca ................. 85/9 W |
| 2,900,965 | 8/1959 | Witzke ................. 52/573 |
| 3,019,864 | 2/1962 | Lester .................. 52/617 |
| 3,094,198 | 6/1963 | Haskins ................ 52/619 |
| 3,742,670 | 7/1973 | Byrd ................... 52/410 |

Primary Examiner—Ernest R. Purser
Assistant Examiner—Robert Farber
Attorney, Agent, or Firm—Cameron, Kerkam, Sutton, Stowell & Stowell

[57] ABSTRACT

A series of heat-insulating panels each consisting of a mat of superposed wire-fabric or wire-mesh elements enclosed within a casing formed of two parallelepipedal metallic half-boxes engaged one inside the other is applied against the sole-plate of a fast reactor shield slab. The lower half-box is of slightly larger size than the upper half-box, a narrow gap being thus formed between the opposite lateral faces of the two half-boxes and a narrow gap being also formed between adjacent casings, the gaps being intended to form capillary sealing joints.

3 Claims, 3 Drawing Figures

HEAT-INSULATING SYSTEM FOR A FAST REACTOR SHIELD SLAB

This invention relates to a heat-insulating system which is primarily intended to be employed in a fast reactor for ensuring thermal protection of a shield slab which serves to close the top portion of the biological shield structure of a reactor of this type. The shield structure in turn encloses an open-topped metallic tank having a vertical axis and containing a mass of liquid metal which usually consists of sodium for cooling the reactor core by removal of the heat generated by nuclear fission. The invention applies more especially in the case in which the closure or shield slab located above the free level of the liquid metal within the tank is separated from this latter solely by a layer of inert blanket gas which usually consists of argon, the shield slab being constituted by a horizontal concrete wall, the wall surface which is in contact with said blanket gas being covered with a metallic sole-plate of stainless steel. Said shield slab also has openings which allow access by handling equipment units to the reactor core within the biological shield structure and at the same time provide a sealed passageway for components such as heat exchangers and pumps which are necessary for the operation of the installation.

In sodium-cooled fast reactors, it is also known that the temperature in the inert-gas atmosphere which is present above the liquid sodium is usually of the order of 500°C. This gives rise to the formation in the inert blanket gas of sodium vapors and aerosols which would be liable to come into contact with the sole-plate of the shield slab if no precaution were taken and thus to cause rapid damage to the sole-plate on the one hand as a result of corrosion effects and on the other hand as a result of mechanical stresses arising from differential thermal expansions.

The invention relates to a heat-insulating system provided in the form of a lining applied against the shield slab in those portions of said lining which are directed towards the interior of the reactor tank, said system being adapted to provide thermal protection of the shield slab under the operating conditions defined in the foregoing, provision being made in particular for metallic structural elements which are incorporated with said lining and afford resistance to corrosion by the liquid sodium, with the exception of mineral heat-insulating materials which are incompatible with the vapors and the aerosols of this liquid metal. Said metallic structural elements are preferably provided in the form of wire fabric, trelliswork or netting elements and are stacked so as to form aerated panels of predetermined thickness which are comparable with a fibrous medium, thereby producing between the sole-plate of the shield slab and the blanket gas located above the level of liquid metal within the tank an acceptable thermal gradient which is adapted to possible reactor power levels both under normal operating conditions and in the event of fault conditions in the circulating pumps accompanied by an abrupt increase in temperature of the liquid sodium.

To this end, the system under consideration which comprises a set of panels each constituted by a mat of superposed metallic elements of fabric or trelliswork extending parallel to the shield slab to be heat-insulated, is distinguished by the fact that each panel is enclosed within a casing applied against the shield slab and formed of two parallelepipedal metallic half-boxes engaged one inside the other, the dimensions of the lower half-box being slightly larger than those of the upper half-box, that the casings are juxtaposed against the surface of the shield slab so as to form a continuous lining, and that the opposite lateral faces of the two half-boxes define a narrow gap between said faces, the adjacent casings being also separated by a narrow gap, said gaps being intended to form capillary sealing joints.

In accordance with a particular feature of the invention, the continuous lining formed by the juxtaposed casings is mounted between the sole-plate of the shield slab and a metallic support and protection wall which maintains said casings applied against the sole-plate by means of fixing studs passed through the wall and the casings and rigidly fixed to the sole-plate at one of their extremities, each stud being provided at the opposite extremity with a threaded portion adapted to cooperate with a locking-nut which is tightened-up against the metallic wall.

In accordance with another feature, each stud has a hollow body which is welded to the sole-plate of the shield slab at one end and closed at the opposite end by a flat plug having an extension in the form of a threaded stem, said flat plug being fitted externally of the hollow body with a metallic seal which is applied against the bottom wall of one of the half-boxes of the casing.

The metallic wall is preferably constituted by an assembly of adjacent plates joined to each other by means of back-plates placed beneath the corners of four adjacent plates, each back-plate being welded to one plate and capable of sliding over the three other plates. In this case and in accordance with an advantageous arrangement, a joint-plate is mounted between the metallic wall and the casings opposite to the connecting back-plates, between the plates and the bottom walls of the half-boxes of the casings.

Further characteristic features of a heat-insulating system as constructed in accordance with the invention and primarily applicable to the closure or shield slab of a fast reactor will become apparent from the following description of one exemplified embodiment which is given by way of indication and not in any limiting sense, reference being made to the accompanying drawings, wherein.

Figure 1:
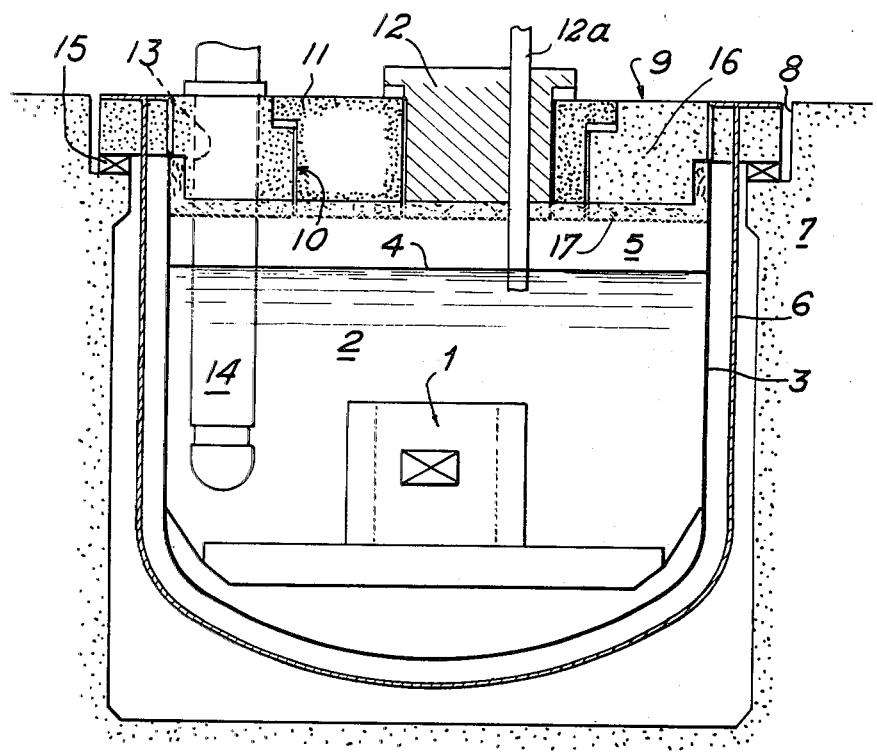
FIG. 1 is a diagrammatic axial sectional view of a fast reactor comprising a top closure or shield slab fitted with a heat-insulating system in accordance with the invention.

In FIG. 1, the reference numeral 1 designates the core of a fast reactor which is represented as being immersed in a suitable mass 2 of liquid metal and especially liquid sodium which has the intended function of cooling the reactor core during operation at power. The liquid metal 2 is confined within an open tank 3 up to the level shown diagrammatically at 4 and an atmosphere 5 of inert blanket gas usually consisting of argon is present above said level 4. The tank 3 is open at the top and in turn surrounded by a second tank or safety tank 6, the unit consisting of both tanks with a common vertical axis being placed within an external biological shield structure 7. Provision is made at the top of said shield structure for a wide circular opening 8 in which is mounted a closure or shield slab 9. Said slab extends horizontally and parallel to the level 4 of liquid sodium within the tank 3 and has a central opening 10 for positioning a system consisting of two shield plugs 11 and 12 which make it possible as a result of combined relative movements of rotation in accordance with a conventional procedure to provide access to the reactor core 1 for a handling tool 12a which passes in leak-tight manner through one of the shield plugs. The shield slab 9 is also provided with further passageways such as 13 in order to mount in these latter the equipment units which are necessary for operation of the reactor and in particular for circulation of the liquid sodium and removal of the heat which is collected as the sodium flows through the reactor core. The equipment units consist especially of pumps and heat exchangers, one of which is represented schematically at 14 in the drawing. The shield slab 9 is supported on a corbel formed in the biological shield structure 7 by a bearing element 15 which ensures immobilization and leak-tightness of the assembly. Finally, the shield slab 9 preferably has a composite structure consisting mainly of a concrete wall 16 of substantial thickness, the wall surface which is in contact with the blanket gas 5 above the level 4 of liquid metal within the tank 3 being lined with a sole-plate 17. By virtue of the presence of the heat-insulating material, said sole-plate 17 can be formed of black steel protected by a corrosion-resistant deposit. During operation, the inert gas atmosphere which is present above the liquid sodium within the tank 3 is at a pressure in the vicinity of atmospheric pressure and is brought to a relatively high temperature of the order of 500°C. Under these conditions, this blanket or inert-gas atmosphere 5 is charged with liquid-metal aerosols or vapors which, if no precaution is taken, are liable to cause rapid corrosion of the sole-plate 17 at the same time as the deformation of this latter under the action of mechanical stresses resulting from differential thermal expansions.

Figure 2:
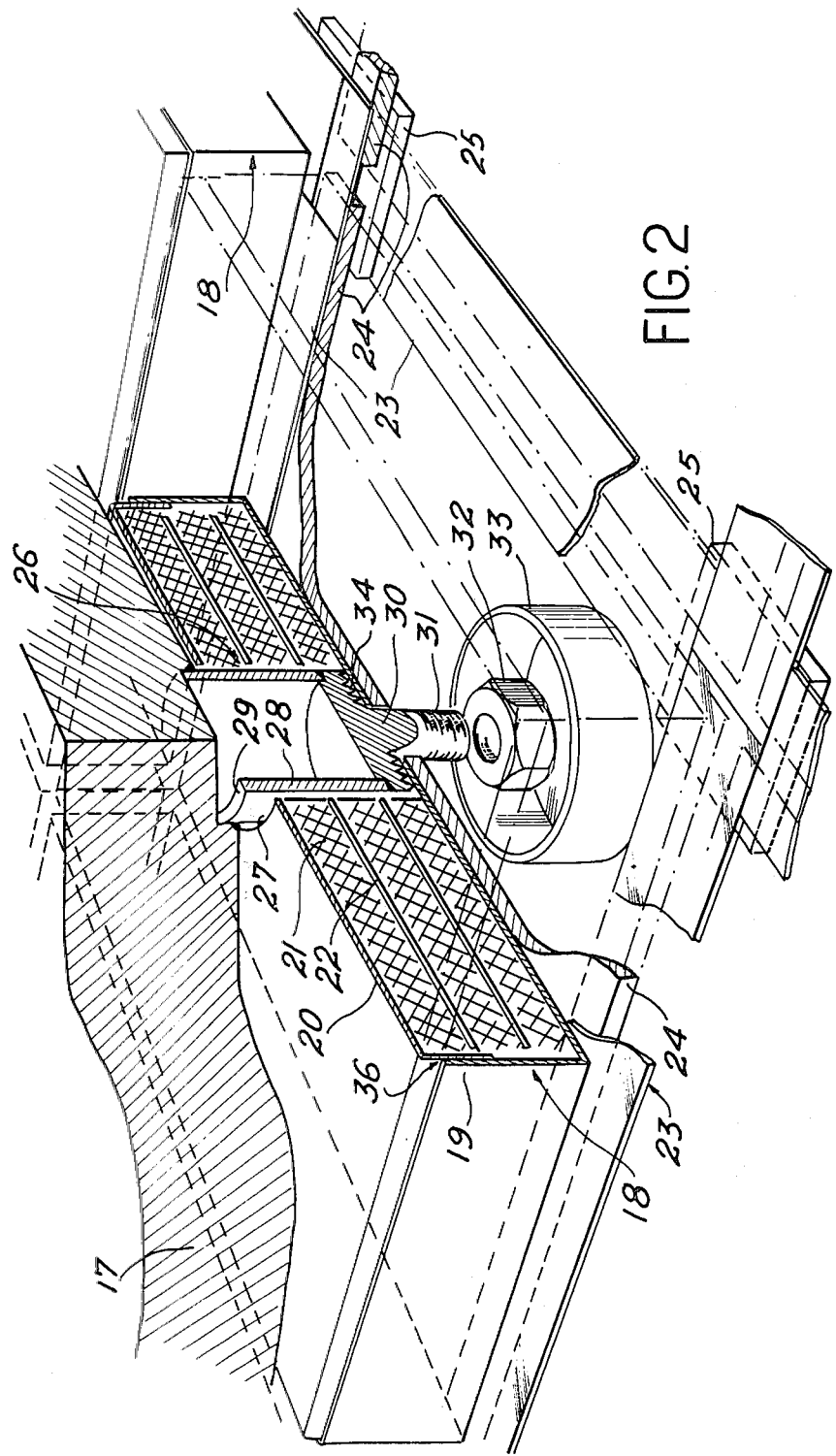
FIG. 2 is an exploded view to a larger scale showing part of the system under consideration.
Figure 3:
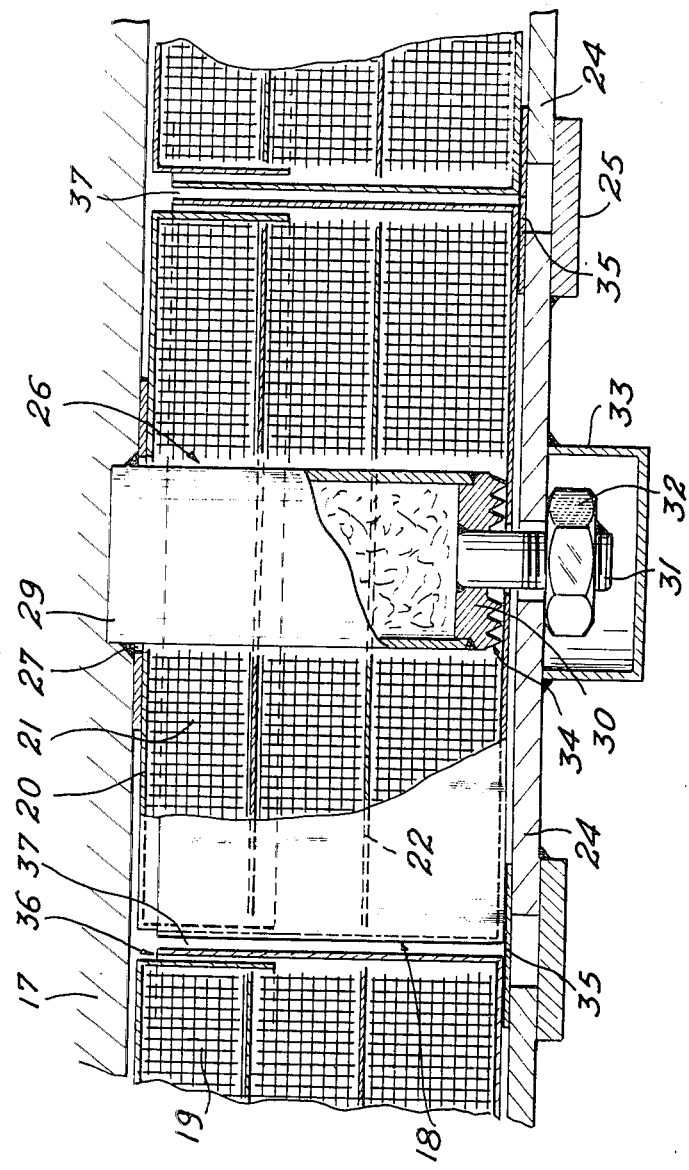
FIG. 3 is a transverse sectional view of the system in accordance with FIG. 2.

Under these conditions, in order to ensure thermal protection of the shield slab 9 and in particular of its bottom sole-plate 17, there is placed against that surface of said sole-plate which is in contact with the blanket gas a heat-insulating system designed in the form of a lining of suitable thickness and applied against said sole-plate, said system as constructed in accordance with the invention being more especially illustrated in FIGS. 2 and 3.

As can be seen from these figures, the heat insulation of the sole-plate 17 is formed by mounting against this latter an assembly of semi-impervious adjacent casings 18 each constituted by means of two half-boxes 19 and 20 respectively which are of generally parallelepipedal shape and adapted to engage one inside the other; these half-boxes can readily be formed by die-stamping, for example. The dimensions of the lower box 19 are slightly larger than the dimensions of the upper box 20, with the result that a narrow gap 36 is formed between the lateral faces of said half-boxes, said gap being open towards the exterior and directed towards the sole-plate 17 of the shield slab to be protected. Each casing thus formed by the assembly of two half-boxes 19 and 20 encloses a heat-insulating panel formed by mats 21 of wire fabric or trelliswork arranged in superposed layers separated by intermediate sheet-metal elements such as the element 22, said mats 21 of wire-fabric elements of the panel being suitably compacted within the interior of the casing 18 while nevertheless permitting an aerated structure to remain within this latter so as to produce a high thermal gradient and to protect the sole-plate of the shield slab against aerosols or vapors of liquid metal derived from the reactor tank. The casings 18 which contain the mats 21 are secured beneath the sole-plate 17 by means of a rigid metallic wall 23 advantageously formed by the side-by-side assembly of rectangular plates 24 having dimensions which are slightly smaller than those of the casings and joined to each other by means of back-plates 25 placed at the corners of four adjacent plates 24, each back-plate 25 being welded to a plate 24 and capable of sliding over the three other adjacent plates 24. The rigid wall 23 is firmly applied beneath the casings 18 and in turn applies these latter beneath the sole-plate 17 while being locked in position by means of fixing studs 26. Each stud advantageously has a hollow body 28 filled with inert gas or with steel wool, one end 29 of which is rigidly fixed to the sole-plate 17 by welding against this latter, for example, the bodies of said studs being passed through bores 27 formed through the casings 18. In addition, the hollow body 28 of each stud is closed at its opposite extremity by a flat plug 30 which is provided externally of the body 28 with a suitably threaded axial extension 31 and this latter traverses the wall 23 through the oppositely-facing plate 24 which cooperates with a locking-nut 32. Beneath the metallic wall 23, said nut is preferably protected by an end-cap 33 which is welded beneath the corresponding plate 24. Finally, leak-tightness of the stud 26 at the point of penetration through each casing 18 is achieved by a metallic seal 34 which is carried by the flat plug 30 and capable of bearing against the bottom of the lower half-box 19 at the time of tightening of the nut 32. Counter-seals 35 in the form of metallic joint-plates are also provided opposite to the back-plates 25 which provide a connection between the plates 24 and the bottom walls of the half-boxes 19 of the adjacent casings.

The respective height of the casings and of the clamping studs is clearly adapted to the thickness of the wire-fabric mats which are mounted within said casings. The degree of compaction of said mats can be adjusted and equalized by means of the clamping pressure applied by the studs so as to form an assembly which is rigidly fixed against the sole-plate of the shield slab, thereby protecting said slab at all points and at any power level of the reactor, either during normal operation or in the event of emergency shutdown accompanied by an abrupt temperature rise of the liquid metal within the reactor tank. The casings are so arranged as to ensure that two adjacent casings are separated by a acapillary gap 37.

It is important to note that the sodium vapors or aerosols which have migrated into the capillary gap 37 condense within said gap and thus form a liquid-metal seal, then a solidified metal seal, depending on the temperature of the level considered. Since the capillary gap 36 which is open towards the sole-plate of the shield slab to be protected or in other words towards the cold zone is placed downstream of the gap 37 from the point of view of migration of the sodium aerosols, said gap will either not contain any liquid sodium or else will contain a solidified sodium seal, depending on the temperatures attained in the cold zone. The relative arrangement of the gaps 37 and 36 serves to prevent migration of the liquid sodium into the interior of the metallic mats 21 and consequently makes it possible to maintain thermal efficiency of the heat insulation even over long periods of reactor operation.

Finally, the wire-fabric mats aforesaid are preferably formed by means of wires having a diameter equal to 0.4 mm in the example of construction which has been more especially described with reference to the drawings. The thickness of each mat within the casings between two consecutive intermediate sheet-metal elements is of the order of 60 mm and a mat is made up of 88 superposed wire-fabric elements.

As is readily apparent, the invention is not limited to the example of construction which has been more especially described with reference to the accompanying drawings but extends on the contrary to all alternative forms. In particular, the casings containing the wirefabric mats which cover the entire surface of the soleplate of the shield slab could be fixed against this latter by means other than the studs considered in this example, especially by being locked in position by means of bearing shells in the vertical portions of the shield slab at the level of penetrations formed within this latter.

What we claim is:

1. A heat-insulating system for a metallic sole plate of a shield slab of a tank of a fast reactor cooled by a liquid metal in the tank with an atmosphere of neutral gas between the liquid metal and the sole plate with aerosols and liquid metal vapors in the atmosphere, said system being applied against the surface of said sole plate and comprising a set of panels each constituted by a mat of superposed metallic elements of fabric extending parallel to the shield slab to be heat-insulated, wherein each panel is enclosed within a casing applied against the shield slab and formed of two parallelepipedal metallic half-boxes engaged one inside the other, the dimensions of one half-box being slightly larger than the dimensions of the other half-box providing a capillary gap between the half-boxes, wherein the casings are juxtaposed against the surface of the shield slab so as to form a continuous lining, the adjacent casings being separated by a narrow gap, said gaps forming capillary sealing joints for condensation of the aerosols and vapors of the liquid metal, wherein the continuous lining formed by the juxtaposed casings is mounted between the sole plate of the shield slab and a metallic support and protection wall which maintains said casings applied against the sole plate by means of fixing studs passed through said wall and said casings and rigidly fixed to said sole plate at one of their extremities, each stud being provided at the opposite extremity with a threaded portion cooperating with a locking-nut which is tightened-up against said metallic wall, said metallic wall being an assembly of adjacent plates joined to each other by back-plates, each of said back-plates being disposed beneath the corners of four adjacent plates, each back-plate being welded to one plate and sliding over the three other plates.

2. A heat-insulating system according to claim 1, wherein each stud has a hollow body which is welded to the sole-plate of the shield slab at one extremity and closed at the opposite extremity by a flat plug having an extension in the form of a threaded stem, said flat plug being fitted externally of said hollow body with a metallic seal which is applied against the bottom wall of one of the half-boxes of the casing.

3. A heat-insulating system according to claim 1, wherein a joint-plate is mounted between the metallic wall and the casings opposite to the connecting back-plates, between the plates and the bottom walls of the half-boxes of said casings.

* * * * *